3,515,532
FERTILISER COMPOSITIONS
John Ramsay Anderson, Bracknell, England, assignor to Imperial Chemical Industries Limited, London, England, a corporation of Great Britain
No Drawing. Filed Oct. 23, 1967, Ser. No. 677,070
Int. Cl. C05c 9/00
U.S. Cl. 71—28  2 Claims

ABSTRACT OF THE DISCLOSURE

A fertilizer composition comprising urea and a hydrolysis inhibiting amount of at least one quinone and at least one polyhydric phenol.

---

The present invention relates to fertiliser compositions, their manufacture and use.

Urea is a useful soil fertiliser containing 46.4% by weight of available nitrogen. However, when added to soil it is normally rapidly hydrolysed, wholly or in part, to ammonia, which may be rapidly lost from the soil into the atmosphere. This hydrolysis is brought about by the action of the enzyme urease. When urea is combine drilled with seeds, the hydrolysis can result in damage to the germinating seeds.

The object of the present invention is to provide an improved fertiliser composition containing urea in which the hydrolysis of the urea is wholly or partially inhibited.

According to the present invention we provide a fertiliser composition comprising urea and an hydrolysis-inhibiting amount of a quinone or a polyhydric phenol. We further provide a fertilization process which comprises treating a culture medium with urea and a hydrolysis-inhibiting amount of such a compound.

The term "quinone" is used in its natural sense to indicate a compound including the structure:

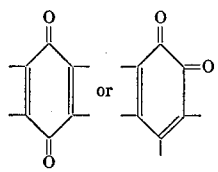

The free valencies shown may be satisfied by any suitable radicals including hydrogen, hydrocarbon radicals, substituted hydrocarbon radicals, halogen atoms, hydroxy groups, ethers and thioethers; they may form part of a ring system, as for example in p-naphthaquinone:

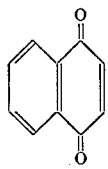

Benzoquinones are particularly useful in our invention and we especially prefer dialkyl-substituted p-benzoquinones in which the alkyl groups have from 1 to 3 carbon atoms. Examples are 3,6-dimethyl-p-benzoquinone, 2-methyl-5-ethyl-p-benzoquinone, 2,5-diethyl-p-benzoquione and 3,6-diethyl-p-benzoquinone. 2,5-dimethyl-p-benzoquinone is outstanding.

Examples of polyhydric phenols which may be used in the invention are catechol, pyrogallol and quinol.

The amount of the quinone or polyhydric phenol used is generally within the range 0.05 to 5% and may conveniently be between 0.1 and 2% by weight of the urea.

A particularly good way of carrying out our invention is to incorporate both a quinone and a polyhydric phenol in the urea composition. Surprisingly, the two classes of compound show synergism together, so that their combined effect in inhibiting hydrolysis is greater than that obtained with the same amount of either material used alone. The amount of the polyhydric phenol used is generally between 10 and 300% molar of the quinone present; conveniently substantially equimolecular quantities may be used.

If desired, the fertiliser composition may contain other ingredients, e.g. other fertilisers including "Nitro-Chalk" (registered trademark) ammonium salts or nitrates, phosphates, potassium salts, growth promoters and granulating agents.

In the process of our invention, the culture medium is generally soil, but may be for example water, e.g. pools, rivers or lakes. The inhibitor compound may be applied before, simultaneously or after the urea, but it is advantageous to use a premixed composition since in this way hydrolysis is more efficiently prevented.

The following examples illustrate our invention.

EXAMPLES 1–17

Inhibition of purified urease in the absence of soil

A simple apparatus was designed in which ammonia, resulting from the hydrolysis of urea, was constantly removed under reduced pressure and trapped in a separate unit containing a suitable acid of known volume and concentration. The amount of acid remaining unneutralised at the end of a definite period of time was determined by titration with a suitable base of known concentration.

The reactants involved were 2.5 mls. of urea solution (2.5% w./v. solution of chemically pure urea in deionised water, pH 6.0 to pH 6.5) and 0.5 mls. of urease solution made by grinding commercial urease tablets to a fine powder and suspending 1.2 gms. of the power in 10 mls. deionised water. The resulting hydrolysis was permitted to run for 150 minutes at 80° F. Inhibitory compounds were added in solution at a rate of 0.1 mls. of a solution of the compound in 10 mls. deionised water. Such inhibitory solutions were added to the urea prior to the addition of the urease solution. Control flasks received 0.1 mls. of deionised water only, in place of the compound. In the controls, hydrolysis was substantially complete after 150 minutes at 80° F. Results for various inhibitors are shown in Table 1.

TABLE 1

| Example | Inhibitor Name | Formula or substituent(s) | Position of substituent(s) | Inhibitor concentration in solution | Percent inhibition of urea hydrolysis |
|---|---|---|---|---|---|
| | Polyhdric phenols: | | | | |
| 1 | Catechol | benzene-1,2-diol (OH, OH) | | 100 | 100 |
| | | | | 80 | 96 |
| | | | | 40 | 90 |
| 2 | Pyrogallol | benzene-1,2,3-triol (OH, OH, OH) | | 100 | 73 |
| | | | | 80 | 74 |
| | | | | 50 | 55 |
| 3 | Quinol | benzene-1,4-diol (OH, OH) | | 100 | 100 |
| | | | | 80 | 100 |
| | | | | 40 | 100 |
| | | | | 20 | 80 |
| | Benzoquinones | $O=\langle\rangle=O$ with R | | | |
| | | | | | 0 |
| 4 | P-benzoquinone | No substituent | | 100 | 100 |
| | | | | 40 | 100 |
| 5 | | R=Cl | 2 | 40 | 100 |
| 6 | | R=Cl | 2,6 | 40 | 100 |
| 7 | | R=Cl | 2,5 | 40 | 104 |
| 8 | | R=—SCH$_2$COOH | 2 | 40 | 9 |
| 9 | | —〈〉—NHCOCH$_3$ | 3 | 40 | 94 |
| 10 | | R=OC$_2$H$_5$ | 2,5 | 40 | 91 |
| 11 | | R=—C$_6$H$_5$ | 2 | 40 | 94 |
| 12 | | R=—CH$_3$ | 2 | 40 | 94 |
| 13 | | R=—CH$_3$ | 2,5 | 40 | 100 |
| 14 | | R=—CH$_2$OH | 2,5 | 40 | 100 |
| | P-naphthaquinones | naphthalene-1,4-dione with R | | | |
| 15 | do | No substituent | | 40 | 100 |
| 16 | | R=—OH | 5 | 40 | 100 |
| 17 | O-naphthaquinone | naphthalene-1,2-dione | | 40 | 100 |

EXAMPLES 18–24

Inhibition of naturally formed urease under soil conditions

The apparatus used in these studies consisted of a glass jar containing a known quantity of soil and a separate glass vial placed inside the glass jar on top of the soil. The vial contained a suitable volume of acid of known concentration to absorb ammonia. The glass jar was sealed with a rubber stopper through which was passed a glass gas lock containing a small volume of the same acid to prevent escape of ammonia whilst still allowing air to enter the glass jar.

The system was thus an aerobic one.

The two and one half grammes of soil contained within each unit was adjusted to approximately one third of the moisture holding capacity by addition of water containing 3.0% w./v. of urea. Inhibitory compounds under test were added to the soil in the above mentioned urea solution to give a final concentration in soil of 40 p.p.m. of inhibitor. Units containing inhibitor and control units containing no inhibitor were incubated at room temperature. In general a three day incubation period was sufficient to result in a 50% evolution of nitrogen as ammonia in the control units. In units containing inhibitors, any 24 hour period of *total* inhibition beyond the control period of three days was recorded as one day's inhibition of urea hydrolysis. Results are shown in Table II.

TABLE II

| Example | Inhibitor | Concentration of inhibitor in soil (p.p.m.) | Soil 1 | Soil 2 | Soil 3 | Soil 4 |
|---|---|---|---|---|---|---|
| 18 | Catechol | 50 | 2-3 | Not examined. | Not examined. | Not examined. |
| 19 | Quinol | 50 | 3 | do | do | Do. |
| 20 | 2,5 dimethyl-p-benzoquinone. | 50 | 7 | do | do | Do. |
| 21 | Catechol+Quinol | 25+25 | 5 | do | do | Do. |
| 22 | Catechol+2,5 dimethyl-p-benzoquinone. | 25+25 | 10 | 17 | 3 | 3-4 |
| 23 | Quinol+2,5 dimethyl-p-benzoquinone. | 25+25 | 10-12 | 17 | 3 | 2-3 |
| 24 | Catechol+Quinol+2,5 dimethyl-p-benzoquinone. | 25+25+25 | 14 | 20 | 4-5 | 4-5 |

*Key to Table 2.*
Soil 1 = Jealott's Hill; a sandy loam, pH 6.0
Soil 2 = Bagshot Sand; a loamy sand, pH 6.5
Soil 3 = Oakham; a clay loam, pH 7.1
Soil 4 = Henley Manor; a calcareous loam pH 8.5

EXAMPLE 25

A composition containing urea and the inhibitor of Example 1 was made by adding 10 parts by weight of the inhibitor to 1,000 parts of powdered urea, agitating the mixture and subsequently forming it into granules.

Sixteen other compositions were made in a similar manner using the inhibitors of Examples 2–17. Compositions were also made with the inhibitor mixtures of Examples 21, 22, and 23 using 2 parts by weight of total inhibitor (1 part of each inhibitor).

All these compositions showed under soil conditions slower hydrolysis than urea to which no inhibitor had been added.

I claim:

1. A fertilizer composition comprising urea and a hydrolysis inhibiting amount of at least one quinone and at least one polyhydric phenol, said quinone being selected from the group consisting of benzoquinones and naphthaquinones, optionally substituted by chlorine atoms, hydroxy, methyl, substituted methyl, ethoxy, substituted thiomethyl, phenyl and substituted phenyl groups; and said polyhydric phenol being selected from polyhydric phenols having two or three nuclear groups, the amount of said quinone and phenol added is 0.05–5% by weight based on the urea and the amount of said polyhydric phenol being between 10 and 300% molar of the quinone present.

2. A fertilizer composition comprising urea and a hydrolysis inhibiting amount of quinol.

References Cited

UNITED STATES PATENTS 3,388,989  6/1968  Sor _____ 71—28

OTHER REFERENCES

Hochster, R. M. and Quastec, J. H.: Metabolic Inhibitors, Academic Press, New York, 1963.

Gortner, R. A.: Outlines of Biochem., John Wiley and Sons, New York, 1949.

Reddish, C. F.: Antiseptics, Disenfectants, Fungicides and Sterilization, Lea & Febiger, Philadelphia, 1957.

Hoffman-Ostenhof et al.: Bacteriostatic Quinones, and other antibiotics. In Monatoh. 78, pp. 273–6 (1948).

REUBEN FRIEDMAN, Primary Examiner

C. N. HART, Assistant Examiner